(12) United States Patent
Gomolski

(10) Patent No.: US 10,675,958 B1
(45) Date of Patent: Jun. 9, 2020

(54) TENSION ANCHOR DEVICE

(71) Applicant: GoHide, LLC, Parker, CO (US)

(72) Inventor: Kevin Gomolski, Parker, CO (US)

( * ) Notice: Subject to any disclaimer, the term of this patent is extended or adjusted under 35 U.S.C. 154(b) by 12 days.

(21) Appl. No.: 16/111,031

(22) Filed: Aug. 23, 2018

Related U.S. Application Data

(63) Continuation-in-part of application No. 14/712,690, filed on May 14, 2015, now Pat. No. 10,150,602.

(60) Provisional application No. 61/996,838, filed on May 14, 2014.

(51) Int. Cl.
  *B60P 7/04* (2006.01)
  *B60J 7/10* (2006.01)
  *B65H 59/26* (2006.01)

(52) U.S. Cl.
  CPC .............. *B60J 7/104* (2013.01); *B65H 59/26* (2013.01)

(58) Field of Classification Search
  CPC ........... B60R 7/104; B60R 11/02; B60R 7/10; B60R 11/06; B60R 11/00; B60R 5/047; B60P 7/0876; B60P 7/04; Y10T 24/4773; Y10T 403/7007; Y10T 403/7005
  USPC .................................. 224/455, 460, 534, 568
  See application file for complete search history.

(56) References Cited

U.S. PATENT DOCUMENTS

| | | | | |
|---|---|---|---|---|
| 3,248,089 A | * | 4/1966 | Barney | E04H 17/12 256/48 |
| 5,197,839 A | * | 3/1993 | Willey | B21J 15/42 411/103 |
| 6,206,454 B1 | | 3/2001 | Cory | |
| 7,025,404 B1 | | 4/2006 | Gilbert | |
| 7,481,610 B1 | * | 1/2009 | Egigian | B60P 7/0807 410/106 |
| 7,992,262 B2 | * | 8/2011 | Thompson | B63B 21/04 24/115 K |
| 8,459,516 B2 | * | 6/2013 | O'Regan | B60R 5/04 224/402 |
| 2007/0057528 A1 | * | 3/2007 | Fox | B60P 7/0876 296/100.16 |
| 2010/0123331 A1 | * | 5/2010 | Buelna | B65D 88/124 296/100.15 |

FOREIGN PATENT DOCUMENTS

EP        0 280 441       9/1990

* cited by examiner

*Primary Examiner* — Adam J Waggenspack
(74) *Attorney, Agent, or Firm* — Reilly Intellectual Property Law Firm

(57) ABSTRACT

A tension anchor device for securing a cable, having a mounting platform, an anchor base and an anchor nut secured to the cable for locking engagement with the anchor base.

18 Claims, 3 Drawing Sheets

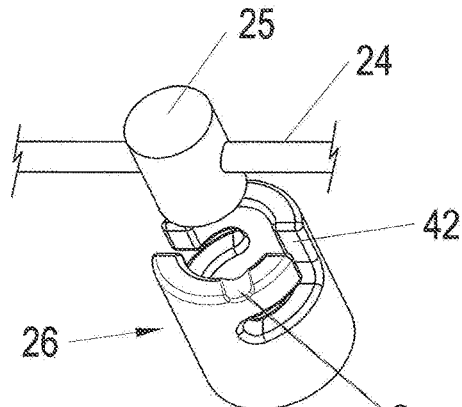
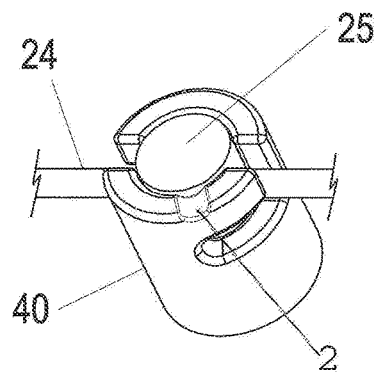
Fig. 1  Fig. 2
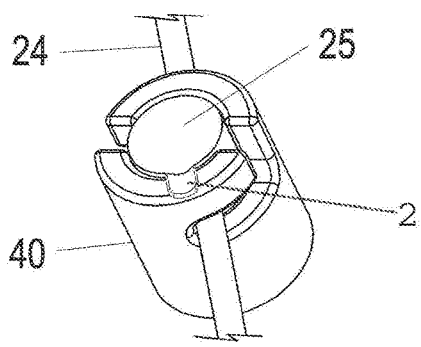
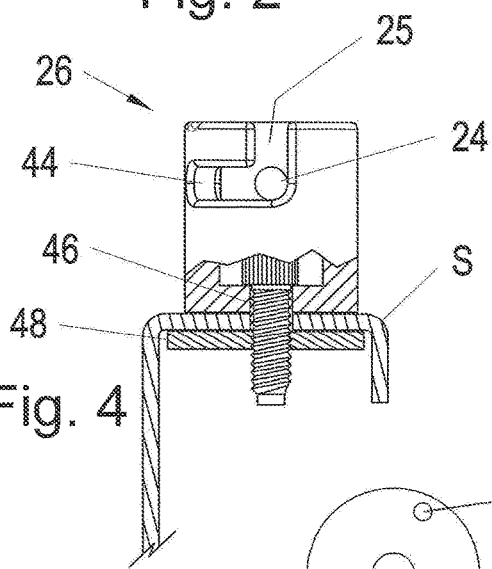
Fig. 3  Fig. 4
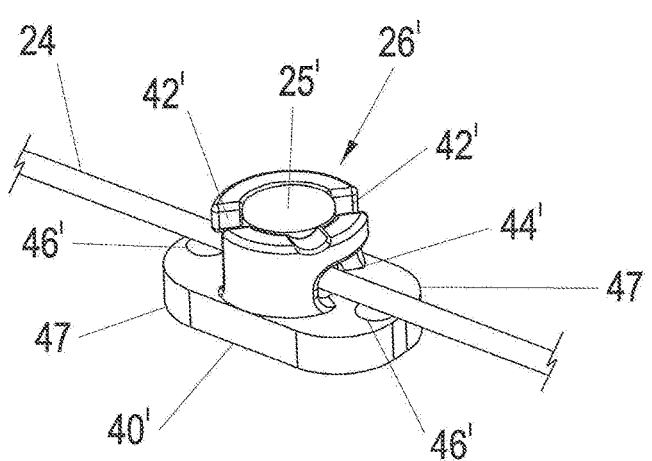
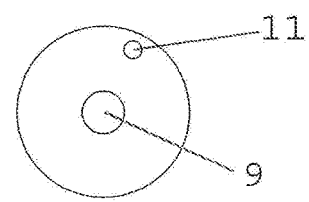
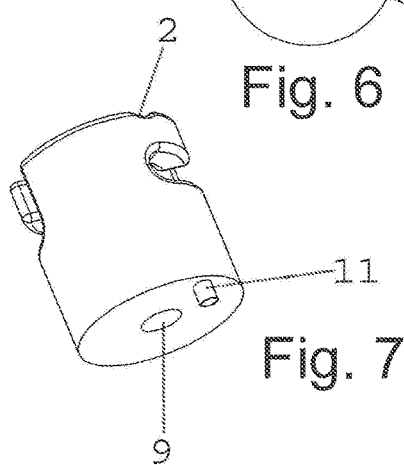
Fig. 5  Fig. 6  Fig. 7

TENSION ANCHOR DEVICE

The present application is a continuation-in-part application of utility patent application Ser. No. 14/712,690 filed on 14 May 2015 which is a conversion of provisional patent application Ser. No. 61/996,838 filed 14 May 2014, for FLEXIBLE, LOCKABLE CARGO COVERS AND CONTAINERS and herein incorporated by reference.

The following relates to a tension anchor locking device and more particularly relates to a novel and improved tension anchor device for securing covers on open areas.

The anchor device is adaptable for use in vehicles and bicycles and many other uses when a securing device is needed. It can also be utilized as an anchor mount for a traditional cargo cover or for use in a motor vehicle in order to protect items from theft as well as from environmental conditions. Broadly the tension anchor device may be included in an article of manufacture that will have anywhere from two to five main components, namely: a multi-layered sheet which includes an intermediate mesh-like theft-proof layer having an outer surrounding adjustable cable with a locking mechanism, one or more tension anchor bases to secure the unit in place to a fixed article, such as, a cargo compartment of a motor vehicle, a locking mechanism, anchor mounts and cable stays or hooks.

There is provided a tension anchor device for cable insertion comprising a platform member having at least one bolt opening aligned with at least one spaced opening on a fixed support and at least one threaded bolt member in the at least one spaced opening for threaded engagement with the fixed support, a base member having a pair of slots, a cable being insertable through the slots and rotated to prevent release of the cable from the base member when the base member is in locking engagement with the fixed support. The base member includes an upper slotted end for insertion of the cable and a downwardly extending nut through the slotted end, the nut being rotatable on the base member. The nut may be rotated into a closed position within the base member. The anchor device slots are in diametrically opposed relation to one another, each of the slots extending in an axial direction and terminating in a radial slot with a circular slot extending the greater length of the base member and terminate in a lateral slot. The base member also includes a stabilizing post member.

DESCRIPTION OF DRAWINGS

FIG. 1 is a perspective view of one form of an anchor base and an anchor nut inserted on a tension cable;

FIG. 2 is another perspective view of the anchor base of FIG. 1 with an anchor nut and tension cable inserted into slots of the anchor base;

FIG. 3 is another perspective view similar to FIG. 2 but illustrating the anchor nut and tension cable inserted into a locked position in the anchor base;

FIG. 4 is a view partially in section of the anchor base of FIGS. 1 to 3 in an open position;

FIG. 5 is a perspective view of a modified form of anchor base to that illustrated in FIGS. 1-4;

FIG. 6 is a bottom plan view of FIG. 1;

FIG. 7 is a perspective side view of FIG. 1;

DETAILED DESCRIPTION

Figure 8:
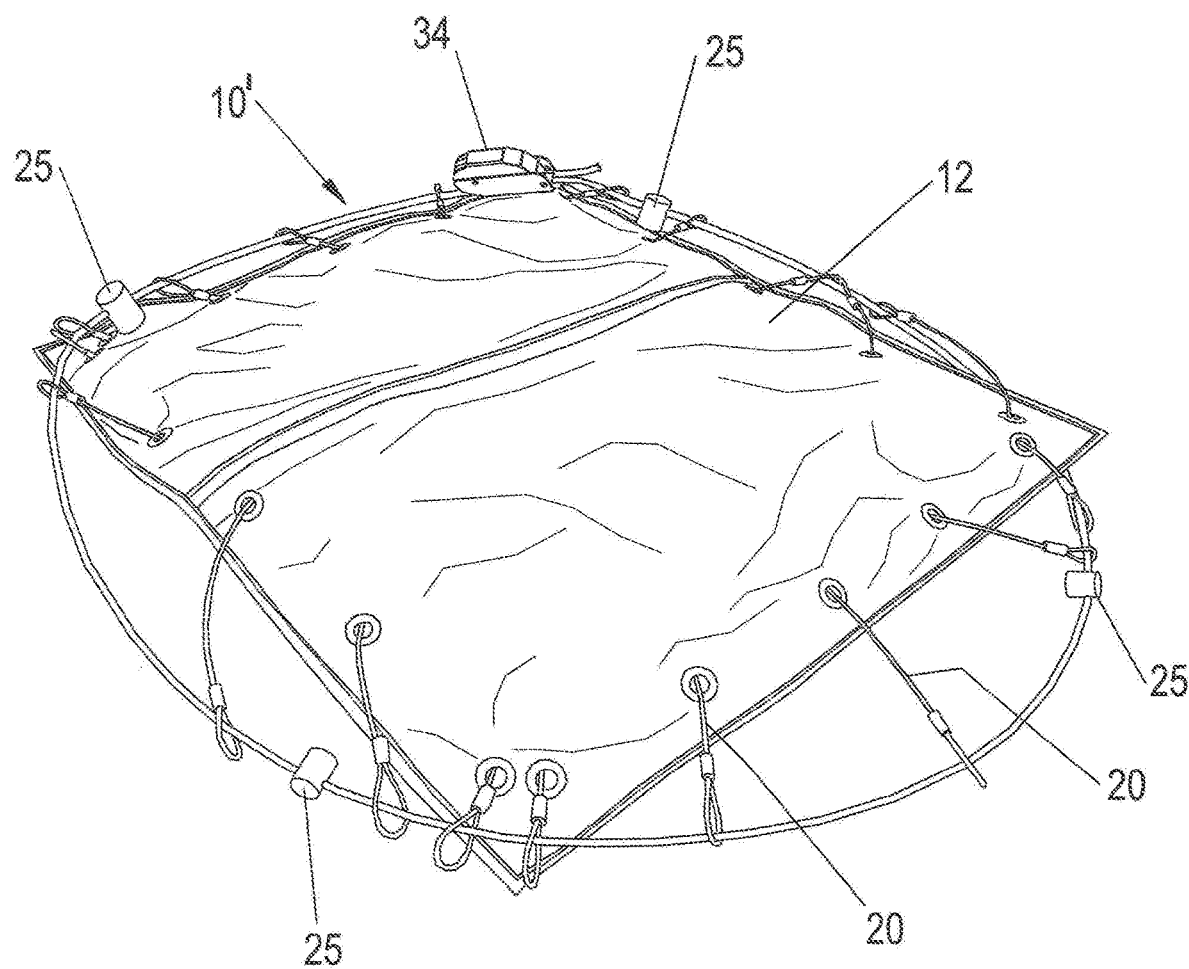
FIG. 8 is a perspective view illustrating a typical manner in which the anchor nut and tension cable are used in conjunction with a cover.

First and second embodiments are illustrated in FIGS. 1-9, showing broadly an anchor base 26. In vehicle applications, anchor nuts 25 are arranged at spaced intervals around border wire or cable 24 and in a manner to be described would typically be positioned at or adjacent to the corners of a security layer of a cargo cover. As best seen in FIGS. 1-7, the tension anchor devices 26 are mounted at spaced intervals along the side walls of S of a vehicle and are representative of various connectors that may be utilized to secure the cover to a vehicle, mount, rack or other object.

Each tension anchor device 26 is comprised of a hollow cylinder or base member 40 having diametrically opposed vertical slots 42 extending in an axial direction and terminating in radially extending slots 44 which extend in opposite directions. The vertical slots 42 have a mid-portion circular slot that will accommodate the nut 25 extending the greater length of the base member 40 and terminating in a lateral slot 9. The tension anchor cylinder 40 and tension anchor nut 25 are preferably made up of metal (steel or aluminum) but may also be manufactured from other high impact resistant materials such as thermoplastic polymers used in injection molds or photopolymers used in 3D printing. The anchor device may be affixed to a vehicle or other article with a bolt 46 which extends downwardly through bolt opening 9 and an upper ledge of the side wall of the vehicle and threaded through a nut 48, or affixed to an anchor mount platform (e.g. a side rail) directly and the platform is then affixed to a vehicle, trailer, or any other type of surface where a tension anchor is required. The tension anchor device can be scaled up to allow for use with much larger cargo covers and for uses with large flatbed or box trailers. The device can also be adapted to lock down large shipping containers as opposed to a cargo cover where the container has the same components installed as the cargo cover.

The upper ledges preferably have bolt holes at spaced intervals or a mounting platform to affix the anchor device 26. The mounting platform may include mounting accessories such as carriage bolts and is adapted to be secured within the cargo area of the vehicle. The mounting platform may include a bolt hole as well as a smaller base stabilizer. The base stabilizer (not shown) corresponds to anti-rotation pin or post member 11 on a lower surface of the tension anchor base or cylinder 40. The anti-rotation pin 11 is affixed into the bottom side of the anchor base and is adapted to fit within the base stabilizer, ensuring that the anchor base 40 does not rotate and also ensuring that the anchor base 40 is in the correct orientation when installed. A cable 24 is threaded through an anchor nut 25 and inserted downwardly through the slot 42 and then rotated through the slot 44 into a fixed or "closed" position.

Channel member 2 located along an upper surface of the hollow cylinder 40 acts as a visual cue to indicate that the cable 24 is in proper alignment or positioning when the cable is in the closed position as described above. The channel member 2 lines up with radially extending slot 44. When the anchor base is installed on the side rail S as shown in FIG. 4, the channel member 2 follows the correct cable direction. Under tension, the cable cannot be rotated back to the open position once the cable is tightened in place.

A modified form of the tension anchor device 26' is illustrated in FIG. 5 wherein like parts to FIGS. 1 and 4 are correspondingly enumerated with prime numerals. In this modified form, a pair of bolts 46' extend through openings in opposite ends 47 of the anchor base 40' and are tightened in place by rotation through a pair of nuts in the sidewall or anchor mount rather than a single nut and bolt. The slots 42' are modified by extending for the greater length of the anchor mount and terminate in lateral slot 44' at the base of the cylinder 40'. In this way, when the cable 24 and associated anchor nut 25' are inserted into the slots 42' and 44' both will pass directly over the upper ends of the bolts 46' making it very difficult for someone to loosen the bolts in order to remove the anchor base or cover.

Figure 9:
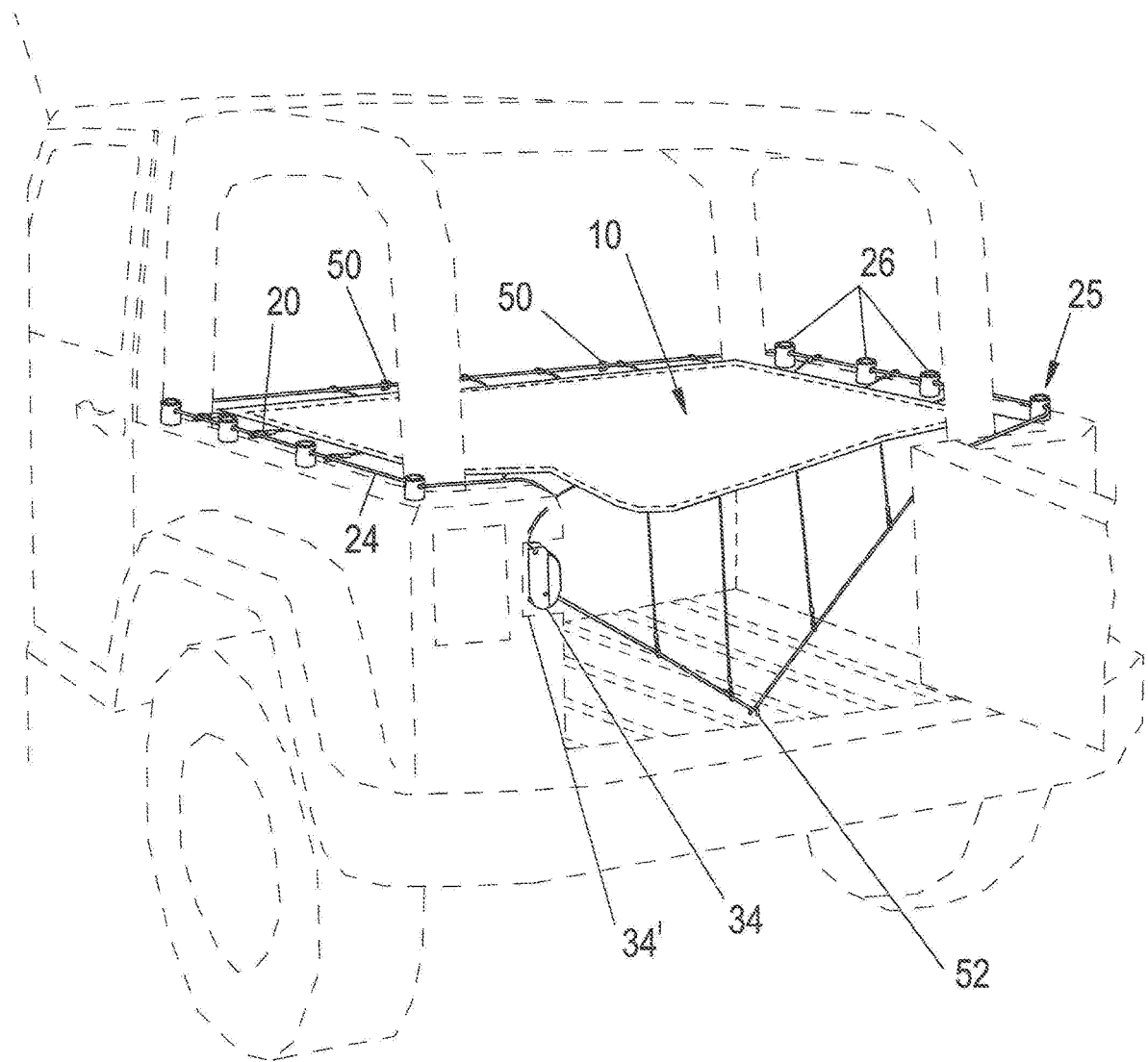
FIG. 9 is a perspective view of FIG. 1, mounted in a cargo bed of a motor vehicle.

Depending upon the size of the cover, ordinarily it is sufficient to mount the anchor bases 40 or 40' at or adjacent to the four corners of the cover. As illustrated in FIG. 9, however, additional anchor bases 26 may be positioned along the sides between the corners; and in addition, the edge of the cover may be connected by means of a hook 50 to the rear end wall of the cab portion of the vehicle. Although one hook is illustrated it will be apparent that multiple hooks 50 may be employed along either end. In addition, one or more hooks 52 may be anchored in the floor of the cargo compartment adjacent to the tail gate so that the cable 24 can extend through the hook(s) 52 to close off the rear end of the cover. The tension cable 24 provides a way to tighten and lock the cover assembly on different parts of a vehicle, such as, in direct surrounding relation to cargo placed in a trunk or cargo area of the vehicle by securing the loose or free ends to the locking mechanism 34.

In use as a cargo cover assembly for a vehicle or trailer, a rack mount on top of the vehicle or in a trunk area, the tension anchor nuts 25 are pre-installed onto the tension cable 24 as the cable is threaded through the looped ends of the security layer. Preferably, there may be a minimum of four anchor nuts 25 installed on the tension cable 24 at the four corners of the assembly as illustrated in FIGS. 8 and 9. In order to secure each anchor nut 25, the anchor base or cylinder 40 and bolt 46 are preinstalled on the sidewall of the vehicle or on an anchor mount as earlier described and the anchor base 40 assembled onto the bolt 46 with the slots 42 aligned for insertion of the cable and rotation into the lower slots 44 into a fixed or closed position. Once placed under tension by the lock assembly, the cable cannot be rotated back to the open position thus providing a secure attachment for the cover assembly. If desired, several anchor nuts 25 can be threaded onto the tension cable 24 depending upon the mounting configuration desired and to provide for multiple points where the cover assembly can be installed.

When an anchor base as described cannot easily be bolted directly to a vehicle, anchor mounts or side rails may be utilized to provide for a secondary place to attach each anchor 40. For example, in an off-road vehicle application, a roll bar with an anchor mount platform can be used to provide an attachment point on the roll bar; or can be bolted to a vehicle to provide a mounting surface on a side or top of a vehicle. This allows the cargo cover to be completely secured to the cargo area.

The foregoing description has been presented for purposes of illustration and description. It is not intended to be exhaustive nor to limit the method and system to the precise forms disclosed. Many alternatives, modifications, and variations will be apparent to those skilled in the art in light of the above. Accordingly, the method and system disclosed are intended to embrace all alternatives, modifications, and variations that fall within the spirit and broad scope of the claims.

I claim:

1. A tension anchor device for cable insertion, comprising; a platform member having at least one bolt opening aligned with at least one corresponding opening on a fixed support and at least one threaded bolt member in said at least one spaced opening for threaded engagement with said fixed support; a base member having a pair of diametrically opposed slots and a nut receiving opening, each of said slots extending in an axial direction and terminating in a radial slot; a downwardly extending nut having a tension cable passing therethrough, said nut adapted to be inserted within said nut receiving opening and said cable adapted to be inserted within said slots and rotated to retain said nut within said base member when said base member is in locking engagement with said fixed support.

2. The anchor device according to claim 1 wherein said base member includes an upper slotted end for insertion of said cable and said downwardly extending nut through said slotted end, said nut being rotatable on said base member.

3. The anchor device according to claim 2 wherein said nut may be rotated into a closed position within said base member.

4. The anchor device according to claim 2 wherein said slots are in diametrically opposed relation to one another, each of said slots extending in an axial direction and terminating in a radial slot.

5. The anchor device according to claim 2 wherein said slots terminate in a radially extending slot near a base of said base member.

6. The anchor device according to claim 1 wherein said base member includes a stabilizing post member.

7. The anchor device according to claim 1 wherein said base member includes at least one guide member.

8. An anchor device system for securing cable, comprising:
At least two cylinders each having at least one bolt opening aligned with at least one corresponding opening for each said cylinder on a fixed support and at least two threaded bolt members in said at least one corresponding opening for threaded engagement with said fixed support; each said cylinder having slotted members and
a corresponding anchor nut with a cable member inserted therethrough, said anchor nut and said cable releasably secured within said cylinder slotted members, said anchor nut adapted to be rotated to prevent release of said cable from said cylinder when said anchor nut is in locking engagement with said cylinder.

9. The anchor device according to claim 8 wherein said cylinder includes an upper slotted guide member for said cable.

10. The anchor device according to claim 8 wherein said cylinder includes an external stabilizing post member.

11. The anchor device according to claim 8 wherein said nut may be rotated into a closed position within said cylinder.

12. The anchor device according to claim 8 wherein said slotted members are in diametrically opposed relation to one another, each of said slotted members extending in an axial direction and terminating in a radial slot.

13. The anchor device according to claim 12 wherein said slotted members extend a partial length of said cylinder.

14. An anchor mount for a protective covering comprising: at least one flexible layer of a fabric or plastic material;

eyelets spaced around and extending through the outer periphery of said at least one flexible layer;

a connecting cable extending at spaced intervals from said eyelets and a locking member for tightening terminal free ends of said connecting cable;

anchor bases attached at spaced intervals on a fixed support in outer circumferentially spaced relation to stored articles, said anchor bases having a nut receiving opening; and downwardly extending nuts having a tension cable passing therethrough, said nuts adapted to be inserted within said nut receiving opening and rotated to retain said nut within said anchor bases.

15. The anchor mount for a protective covering according to claim 14 wherein said fixed support has upper ledges with bolt holes at spaced intervals for said anchor bases, said anchor bases each including an upper slotted end for insertion of said cable and a downwardly extending bolt inserted through openings and threadedly connected to said fixed support.

16. The anchor mount for a protective covering according to claim 15 wherein said anchor bases have an upper cylinder portion being rotatable on said bolt into fixed engagement with said fixed support.

17. The anchor mount for a protective covering according to claim 16 wherein each of said anchor bases includes a base member having a pair of bolt openings aligned with spaced openings in said fixed support, and a pair of threaded bolt members in said spaced openings for threaded engagement with said fixed support.

18. The anchor mount for a protective covering according to claim 17 wherein each of said tension anchors includes a cylinder and a pair of slots in diametrically opposed relation to one another, each of said slots extending in an axial direction and terminating in a radial slot, said cable being insertable through said axial slots and rotated in said radial slots to prevent release from each said cylinder when said cylinder is in locking engagement with said ledge.

\* \* \* \* \*